A. J. BRANHAM.
SEED-PLANTER.

No. 176,215.  Patented April 18, 1876.

WITNESSES:
A. W. Almqvist
John Goethals

INVENTOR:
A. J. Branham
BY
ATTORNEYS.

UNITED STATES PATENT OFFICE.

ALVIN J. BRANHAM, OF HOUSTONIA, MISSOURI.

IMPROVEMENT IN SEED-PLANTERS.

Specification forming part of Letters Patent No. 176,215, dated April 18, 1876; application filed March 13, 1876.

*To all whom it may concern:*

Figure 1:
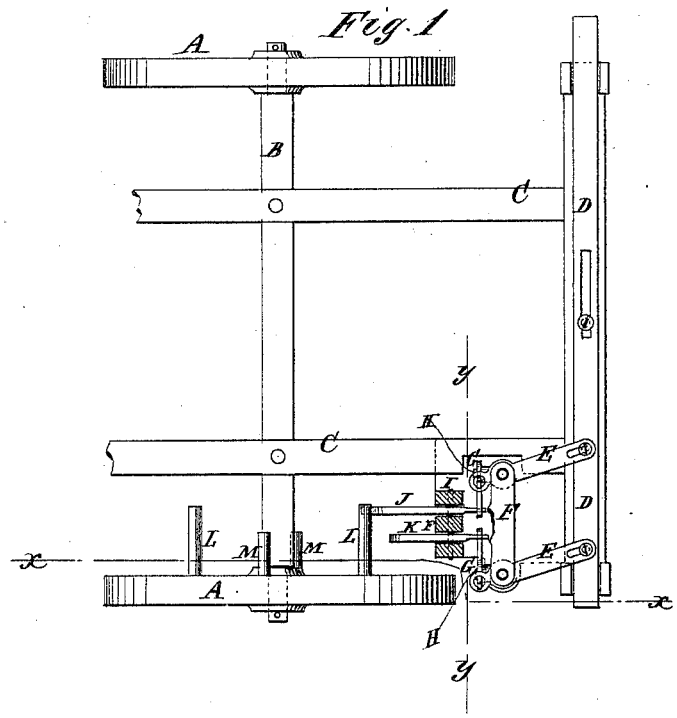
Figure 2:
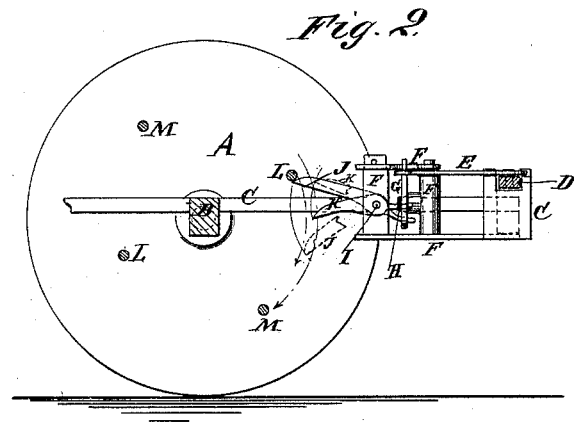
Figure 3:
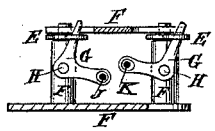

Be it known that I, ALVIN J. BRANHAM, of Houstonia, Pettis county, Missouri, have invented a new and Improved Seed-Planter, of which the following is a specification:

Figure 1 is a top view, partly in section, of my improved device, shown as applied to a seed-planter. Fig. 2 is a side view of the same, partly in section, through line $x\,x$, Fig. 1; and Fig. 3 is a detail section of the same, taken through line $y\,y$, Fig. 1.

Similar letters of reference indicate corresponding parts.

The object of this invention is to furnish an improved device for operating the dropping-bar of a seed-planter from the wheel, which shall be simple in construction, easily applied, and reliable in operation, dropping the seed regularly and at uniform distances apart.

The invention consists in the combination of the two levers, the two bent levers, the two unequal levers, and the two sets of pins with the dropping-bar and the wheel of a seed-planter, as hereinafter fully described.

A are the wheels, B is the axle, C is the frame, and D is the sliding seed-dropping bar, about the construction of which parts there is nothing new. E are the two parallel levers, the forward ends of which have short slots formed in them to receive the pins, screws, or bolts by which they are pivoted to the dropping-bar D. The levers E are pivoted near their rear ends to a small frame, F, attached to the frame C, and at their rear ends are pivoted to the upper ends of the right-angled levers G, which are pivoted at their angles to the frame C by the pivots H. The lower arms of the elbow-levers G project toward each other, and to their ends are pivoted the forward ends of two levers, J K, which are pivoted, near their forward ends, to the frame F by the pivot I. The levers J K are of unequal length, and their projecting rear ends are beveled off upon the upper side. To the inner side of the wheel A are attached two sets, L M, of pins, arranged at such distances from the axis of the said wheel that they may strike and operate the levers J K alternately, to move the dropping-bar D in opposite directions to drop the seed.

By increasing or diminishing the number of pins J K the hills may be planted at any desired distance apart.

The device may be applied to any planter in which the seed is dropped by slides, so as to make them automatic in their operation.

Having thus described my invention, I claim as new and desire to secure by Letters Patent—

The combination of the levers E, the two bent levers G, the two unequal levers J K, and the two sets of pins L M, with the dropping-bar D and the wheel A of a seed-planter, substantially as herein shown and described.

ALVIN J. BRANHAM.

Witnesses:
S. CARR,
JOHN BURKHART.